United States Patent [19]

Eatherton

[11] 4,431,405
[45] Feb. 14, 1984

[54] GAS POLLUTION CONTROL APPARATUS AND METHOD AND WOOD DRYING SYSTEM EMPLOYING SAME

[75] Inventor: J. Roger Eatherton, Sacramento, Calif.

[73] Assignee: Down River International, Inc., Sacramento, Calif.

[21] Appl. No.: 351,496

[22] Filed: Feb. 23, 1982

[51] Int. Cl.³ .................... F27B 1/08; B01D 43/00; B01D 39/02; F23K 3/00
[52] U.S. Cl. ........................................ 432/72; 55/98; 55/512; 110/102; 110/226; 110/345; 432/103; 432/120
[58] Field of Search ............... 432/72, 103, 120, 222; 110/102, 226, 345; 55/98, 512

[56] References Cited

U.S. PATENT DOCUMENTS

| | | | |
|---|---|---|---|
| 360,958 | 4/1887 | Gaskins | 34/80 |
| 1,518,516 | 12/1924 | Jones et al. | 34/82 |
| 3,326,670 | 6/1967 | Bratton | 55/512 |
| 4,017,254 | 4/1977 | Jones | 432/72 |
| 4,017,980 | 4/1977 | Kleinguenther | 34/143 |
| 4,233,024 | 11/1980 | Plass | 432/72 |
| 4,237,780 | 12/1980 | Truhan | 110/102 |

Primary Examiner—John J. Camby
Attorney, Agent, or Firm—Klarquist, Sparkman, Campbell, Leigh & Whinston

[57] ABSTRACT

Pollution control apparatus and method are disclosed in which hot exhaust gas containing pollutants including solid particles and hydrocarbon vapors is treated by transmitting such exhaust gas through a container containing wood members, such as wood chips, which serve as a filter media for filtering out such pollutants by causing such solids to deposit and such hydrocarbon vapors to condense upon the surface of the wood members. The contaminated wood chips are discharged from the filter and further processed into chip board or other commercial wood products thereby disposing of the pollutants. Lumber may be used as the wood members of the filter in a lumber kiln by deposition of solid particles on the rough surface of such lumber. The contaminated surfaces of the lumber are removed by a planer which produces a smooth finished lumber and contaminated wood chips that may be processed into chip board or other commercial wood products. A wood drying system employing such pollution control apparatus and method includes a hot air dryer for wood or other organic material, such as a wood chip rotary dryer or a wood veneer dryer, which produces hot exhaust gases containing pollutants including hydrocarbon vapors and solid particles. This hot exhaust air is transmitted through a lumber kiln to dry lumber thereby conserving heat energy and causing solid particle pollutants to deposit on the surface of the lumber. The kiln exhaust air containing solid and hydrocarbon vapor pollutants is then transmitted up through a filter stack of wood chips.

34 Claims, 3 Drawing Figures

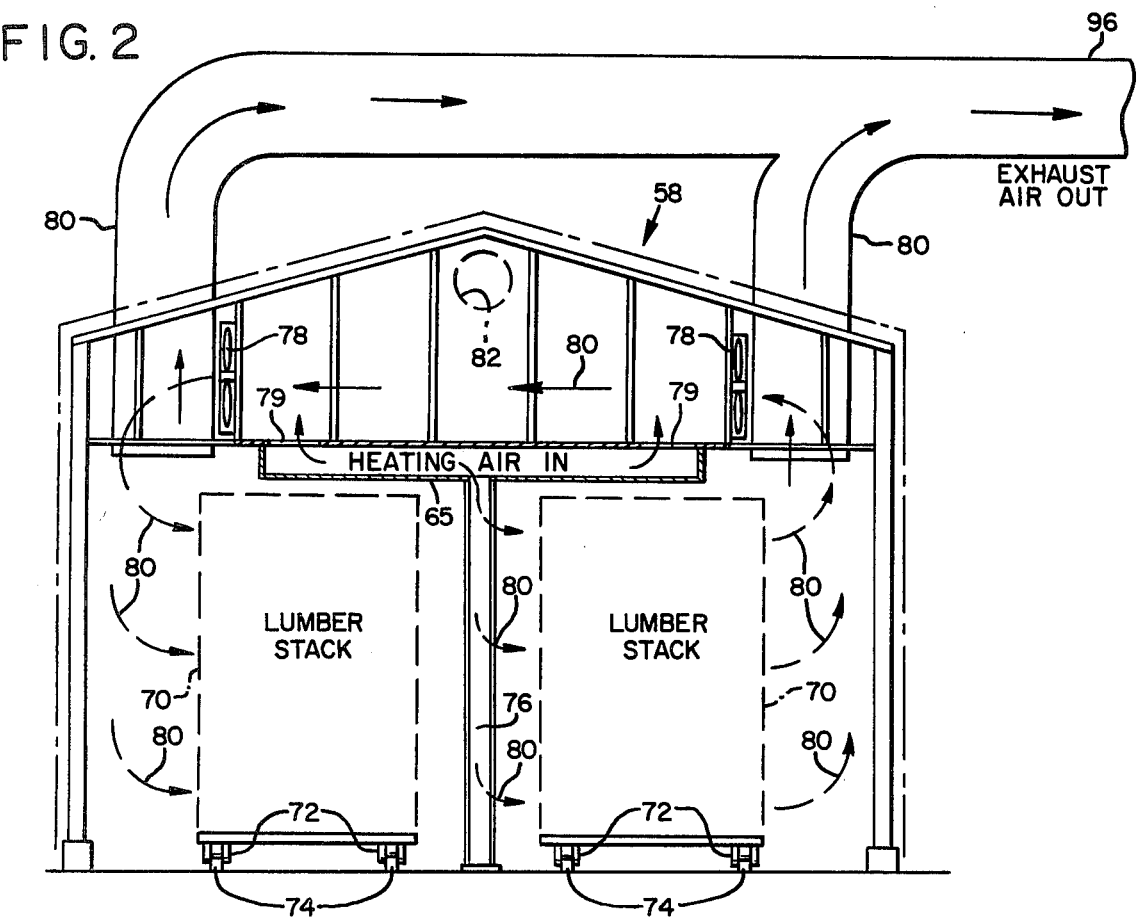
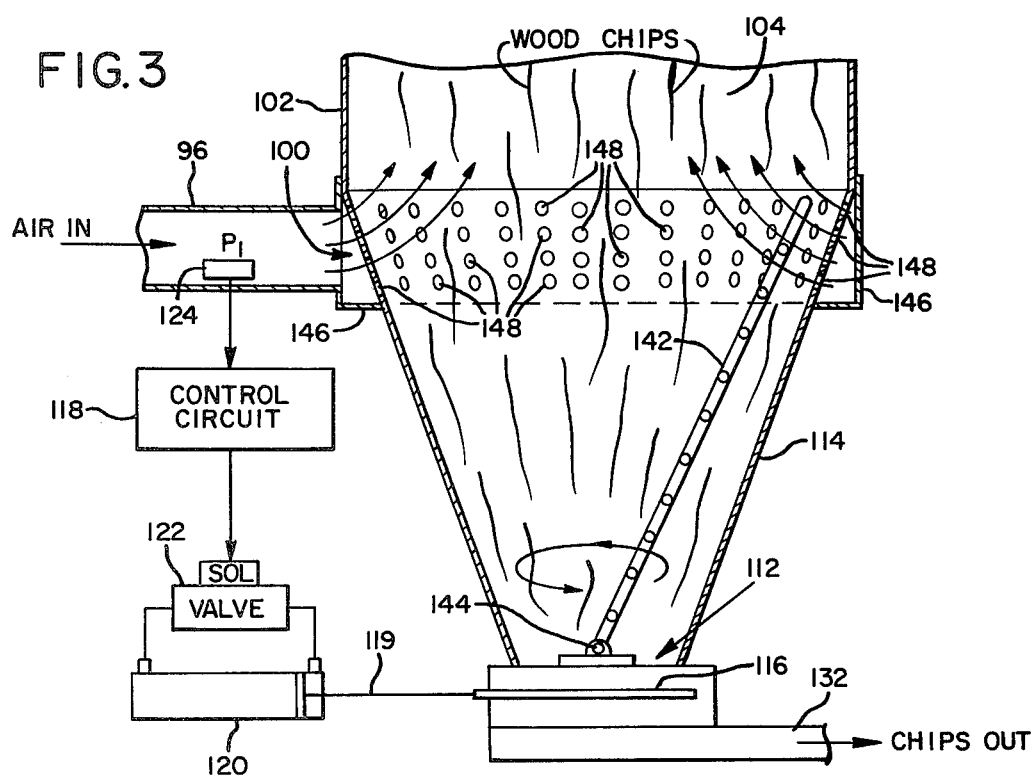

GAS POLLUTION CONTROL APPARATUS AND METHOD AND WOOD DRYING SYSTEM EMPLOYING SAME

BACKGROUND OF INVENTION

The subject matter of the present invention relates generally to gas pollution control apparatus and methods, and in particular, to such pollution control apparatus and method for treating hot exhaust gas using wood members as a filter media to remove pollutants and to conserve heat energy as well as to dispose of the pollutants by using the contaminated filter media in the production of a commercial product. In the pollution control apparatus and method of the present invention the wood members used as the filter media may be wood chips or lumber supposed in a stack within a container to remove pollutants from the hot exhaust gas by depositing solid particles and condensing hydrocarbon vapors of such pollutants on the surface of such wood chips or lumber. The stack of wood chips may be supported in a vertical silo container, while the lumber is supported in stacks within a lumber kiln, where such wood chips or lumber are dried and also serve as a filter media. The contaminated surface of the lumber is removed by a planer after unloading such lumber from the kiln, to produce contaminated wood chips. The contaminated wood chips from the silo or from the lumber planer are then further dried and processed to produce a chip board or other commercial wood products thereby disposing of the pollutants.

A wood drying system in accordance with the present invention employs a hot air dryer of wood or organic material, such as a rotary wood chip dryer or a wood veneer dryer, whose hot exhaust gas contains pollutants including solid particles and hydrocarbon vapors. This dryer exhaust gas is transmitted to a lumber kiln for drying the lumber thereby conserving heat energy and for removing from such gas solid particle pollutants which are deposited on the rough surface of the lumber. The kiln exhaust gas is then transmitted through a filter stack of wood chips which may be contained within a vertical silo, for removing remaining pollutants from the gas by causing the hydrocarbon vapors to condense on the wood chips and blocking the passage of the solid particles with such wood chips. The contaminated wood chips are discharged from the bottom of the silo then mixed with clean wood chips and conveyed to the rotary dryer for further drying and subsequent use of such dried chips to manufacture chip board or other commercial wood products. The rough sawn surfaces of the lumber catch many solid particles from the dryer exhaust air and the decrease in temperature within the kiln may cause some of the hydrocarbon vapors to condense onto such surface of the lumber. After kiln drying, the lumber is removed from the kiln and the contaminated surface layer of the lumber is removed by a planer to produce smooth finished lumber. The removed surface layer may produce other contaminated wood chips which are also transmitted back to the rotary dryer for drying and subsequent use in the production of chip board.

While any source of hot air can be employed for the rotary wood chip dryer, it is most economical to use a wood dust burner which burns fine wood particles, such as sander dust, but mixing such wood particles with air and causing combustion thereof. The combustion products carried by such hot air contain pollutants including solid particles such as ash and hydrocarbon vapors. Most of the solid particles of ash are removed by a cyclone furnace separator connected to the burner ignition chamber. However, the hot air supplied to the wood chip dryer by such a burner still contains much pollution in the form of solid particles and hydrocarbon vapors which are transmitted through the rotary dryer to dry the wood chips therein. Additional hydrocarbon vapors are emitted from the wood chips in the rotary dryer so that the dryer exhaust air contains much pollution which must be removed by the lumber and/or wood chip filter media in the manner of the present invention.

Previously it has been proposed to filter a stream of hot exhaust air using inorganic filter media such as sand, rocks or porous ceramic filters. Such filters have the disadvantage that they must be cleaned to remove the captured pollutants actually by washing with water before reuse of such filter media. This also results in contaminated waste water containing pollutants which presents a waste disposal problem. In addition, wet scrubbers have been used to filter pollutants from a stream of hot exhaust air, but these consume much electrical power and also have a contaminated waste water disposal problem. Electrostatic precipitators can also be used to filter such exhaust gas but they are extremely expensive and must be cleaned frequently by washing which creates a similar waste water disposal problem. These problems are avoided using the replaceable wood filter media of the present invention which is used to manufacture commercial wood products to dispose of the pollutants removed by such filter media.

SUMMARY OF INVENTION

It is therefore one object of the present invention to provide an improved pollution control apparatus and method for removing pollutants from gas in an efficient manner by using wood as a filter media.

Another object of the invention is to provide such pollution control apparatus and method in which wood members held within a container are used as the filter medium to remove solid particles and hydrocarbon vapor pollutants from hot exhaust gas by causing such pollutants to deposit and to condense on the wood members after which the contaminated wood members are discharged from the filter container for subsequent processing and used in the production of commercial wood products thereby disposing of the pollutants in a simple and inexpensive manner.

A further object of the invention is to provide such a pollution control apparatus and method in which the filter media is wood chips supported within a container as a stack of chips with the hot exhaust gas flowing from an air inlet at one end of the container through the stack to an air outlet at the other end of such container, and the contaminated wood chips having pollutants deposited thereon are discharged through a discharge opening at the air inlet end of the container while clean wood chips are fed into the other end of the container to provide efficient filtration and condensation of the pollutants as well as drying of the wood chips.

An additional object of the present invention is to provide such a pollution control apparatus and method in which the wood members of the filter media are lumber supported within a lumber kiln and having rough surfaces onto which the solid particle pollutants are deposited, such lumber being removed from the kiln after drying and the contaminated surface of the lumber being removed with a lumber planer to produce smooth finished lumber and provide contaminated wood chips which are further processed and then employed in the production of commercial wood products for efficient use and disposal of the pollutant.

Still another object of the present invention is to provide a wood drying system including a hot air dryer of wood or organic material whose hot exhaust gas is transmitted to a lumber kiln and/or a silo containing a stack of wood chips serving as a disposable filter media, for drying the lumber in the kiln and for partially removing solid particle pollutants in the exhaust air by contact with the rough surfaces of the lumber, and transmitting the kiln exhaust gas or the dryer exhaust gas to the silo of wood chips so that the exhaust gas is transmitted up through the stack of wood chips to dry the wood chips and to remove the remaining pollutants in such exhaust gas including hydrocarbon vapors which are condensed on the wood chips for efficient removal of pollutants and conservation of heat energy.

A still further object of the invention is to provide such a dryer system using a highly economical source of the hot air supplied to the dryer in the form of a wood dust burner whose hot output air contains pollutants including ash particles and hydrocarbon vapors which are filtered out of the air by the lumber kiln and/or wood chip filter in an efficient and inexpensive manner.

An additional object of the invention is to provide such a wood drying system in which the hot air dryer is a rotary dryer of wood chips and the contaminated wood chips discharged from the wood chip filter are fed into such dryer for further drying, and subsequently processed by manufacturing wood into wood chip particle board or other commercial wood products.

DESCRIPTION OF DRAWINGS

Other objects and advantages of the present invention will be apparent from the following description of a preferred embodiment thereof and from the attached drawings of which:

FIG. 2 is an enlarged vertical section view taken along the line 2—2 of the lumber kiln used in the system of FIG. 1; and FIG. 3 is an enlarged section view of the bottom end of the silo filter of FIG. 1.

DESCRIPTION OF PREFERRED EMBODIMENT

Figure 1:
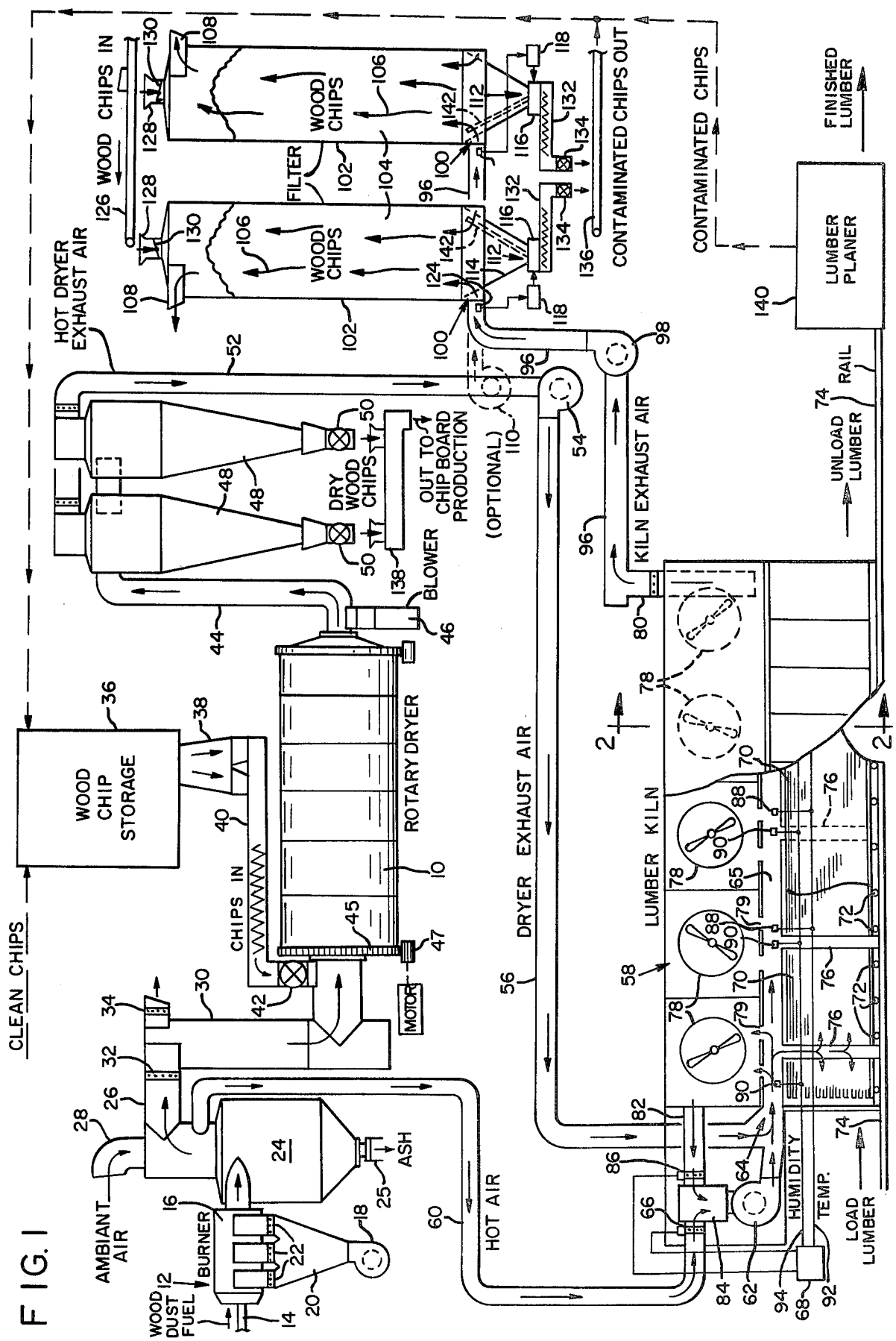
FIG. 1 is a diagram of a wood drying system employing the pollution control apparatuus and method of the present invention, with parts of the lumber kiln broken away for clarity.

As shown in FIG. 1 a wood drying system employing the pollution control apparatus and method of the present invention includes a hot air dryer 10 for drying wood or other organic material, such as a rotary dryer for drying wood chips or a wood veneer dryer. The dryer is fed with hot air from a burner 12 which may be fueled by oil or natural gas, but is preferably a more economical wood dust burner using sander dust fuel transmitted through a fuel inlet 14 of an three stage ignitor chamber 16. The ignitor is also supplied with air by means of a fan 18 through an air distribution manifold 20 having three outlet branches, each directed to a different stage of the ignitor and controlled by a separate motorized damper 22. The combustion products of the ignitor chamber 16 are fed into a cyclone separator furnace 24 which further burns the fuel and separates most of the ash particles from the hot air by the cyclone flow of the combustion products in such furnace and discharges such ash particles through a discharge opening 25 in the bottom of such separator furnace. One suitable rotary wood chip dryer is the triple pass rotary dryer, model 120-400-3 and one suitable wood dust burner is the ROEMMC burner, model 480, both manufactured by Guaranty Performance Co., Inc. of Independence, Kansas. Hot air at a temperature of approximately 1600° F. is fed from the burner 12 through an outlet conduit 26 and mixed with ambient atmosphere air flowing through an ambient air inlet 28, before transmitting the resulting mixture of hot air having a temperature of about 1100° F. and a flow rate of about 50,000 cubic feet per minute through an inlet conduit 30 connected to the inlet of the rotary dryer 10. The temperature and amount of hot air flowing through inlet conduit 30 into the dryer is controlled by changing the setting of a damper 32 in the outlet conduit 26. It should be noted that an adjustable exhaust damper 34 is also provided at the top of the inlet conduit 30 for exhausting a portion of the hot air to the atmosphere before it enters dryer 10 to prevent the temperature of the dryer from exceeding the desired temperature which might otherwise cause damage to the wood chips in such dryer including possible fire.

Wood chips are transmitted from a storage bin 36 through a feeder bin 38 into a screw-type auger conveyor 40. The wood chips are fed by the conveyor 40 through an air lock 42 into the wood chip inlet of the rotary dryer 10. The rotary dryer 10 may be of a three-pass dryer type containing a plurality of concentric rotating drums so that the wood chips pass the entire length of the dryer three times before they are discharged from such dryer through an exhaust outlet conduit 44. The drums of the dryer 10 are geared together and rotated by a sprocket gear 45 driven by a motor powered drive gear 47 at one or both ends of the outer drum. The outlet conduit 44 is connected to a blower fan 46 for sucking the hot burner air and chips through the dryer and blowing the wood chips and the hot exhaust gas from the dryer outlet to the top of a pair of cyclone separators 48 which separate the wood chips from such exhaust gas. The wood chips in the storage bin 36 have an average moisture content of about 40% water, while the dried wood chips discharged from the bottom of the cyclone separators 48 through air locks 50 have a moisture content of approximately 5% water. Thus, the hot dryer exhaust air is transmitted from the top of the cyclone separators 48 through the exhaust conduit 52 and contains much moisture as well as pollutants including solid particles such as the ash and some hydrocarbon vapor produced in burner 12 and other hydrocarbon vapors emitted from the wood chips during drying in dryer 10. The temperature of the dryer exhaust gas in the exhaust conduit 52 is about 175° F. and it flows at a rate of approximately 50,000 cubic feet per minute of air. Such exhaust gas contains about 26 pounds per hour of solid particles. Thus, while approximately 75% of the ash produced by the burner 12 is discharged through ash discharge outlet 25, a large amount of ash and other pollutant particles is still present in the exhaust air transmitted through exhaust pipe 52. In addition to ash, such exhaust air also contains fine wood particles.

The exhaust conduit 52 is connected through a fan 54 which blows the exhaust air through kiln inlet conduit 56 to the input of a lumber kiln 58. In order to increase the temperature and to decrease the moisture content of the air circulated in the lumber kiln 58, hot air is transmitted directly from the burner furnace 24 through supply duct 60 to the kiln by a fan 62 for mixture with the dryer exhaust air at the hot air inlet 64 of the kiln. The hot air in supply duct 60 has a temperature of approximately 1600° F. and a moisture content of approximately 1% water or less while the dryer exhaust air in conduit 56 has a temperature of 175° F. and a higher moisture content of about 25% to 35% water. The amount of hot air which is transmitted through supply duct 60 to the air inlet 64 of the kiln for the desired kiln temperature and humidity is controlled by the setting of a damper 66 in such supply duct. The damper 66 is adjusted by a solenoid in response to the output signal of an electrical control circuit 68 that senses the temperature and humidity of the atmosphere within the kiln in a manner hereafter described. As a result, the heat of the dryer exhaust air in conduits 52 and 56 is employed to dry the lumber in the kiln 58, thereby conserving heat energy. In addition, many of the solid particles polluting the exhaust air are settled in the kiln and deposited on the rough sawn surface of the lumber which is stored in stacks 70 within the kiln as the hot air is circulated over both top and bottom surfaces of the lumber during drying.

The stacks of lumber 70 are carried on wheeled carts whose wheels 72 travel along two parallel tracks having track rails 74 which extend through the lumber kiln 58 from a load input to an unload output at the opposite ends of such kiln. As shown in FIG. 2 the kiln is about fifty-four feet long and employs two parallel tracks for transporting two rows of lumber stacks through the kiln at the same time. In order to provide sufficient hot air circulation between the rows of lumber stacks, a horizontal air inlet conduit 65 is provided along the entire length of the dryer and has a plurality of longitudinal spaced vertical branch conduits 76 which are each provided with a plurality of outlet openings through which the hot air passes at different levels of the lumber stacks 70. A plurality of circulation fans 78 are provided in pairs on opposite sides of the kiln above the air inlet duct 65 and a plurality of vent openings 79 are provided in the top of such duct between each pair of fans. Such circulation fans are positioned to cause a cross-flow of air of about 224,000 cubic feed per minute within the kiln in the direction 80 shown in FIG. 2 substantially perpendicular to the longitudinal axis of the kiln and to the general flow of heating air through input ducts 65 from the hot air inlet 64 to a pair of exhaust outlets 80 at the opposite end of the kiln from such inlet. Thus, the heating air travels in a generally spiral path down the length of the kiln for increased circulation and more complete drying of the lumber under controlled humidity and temperature for about sixty hours for each kiln load of lumber.

A recirculation duct 82 is provided within the kiln for recirculating hot air from the front end of the kiln to the exterior of the kiln where it is mixed with the hot air transmitted through supply duct 60 from the burner at a mixer junction 84 between such two ducts. This reduces the temperature of the mixture of recirculation air and the hot burner air below 500° F. so that it does not burn up the motor for fan 62. Thus, the temperature of the air flowing through fan 62 is typically about 450° F. This hot air is then mixed with the dryer exhaust air flowing through conduit 56 at approximately 175° F. in an amount sufficient to provide the drying air flowing through the air inlet conduit 65 with the proper drying temperature and humidity for the kiln. Both the amount of hot burner air transmitted from pipe 60 and the amount of recirculation air transmitted from duct 82 through mixer junction 84 are controlled by the setting of dampers 66 and 86, respectively. These dampers are both controlled by separate outputs from control circuit 68. Thus, the dampers 66 and 86 may both be moved by solenoids whose current is supplied by the output signals of control circuit 68 in an amount dependent upon the average humidity and average temperature of the kiln atmosphere as sensed by temperature sensors 88 and humidity sensors 90 located throughout the dryer adjacent the lumber stacks. The temperature sensors 88 may be in the form of dry bulb temperature measurement devices while the humidity sensors 90 may in the form of wet bulb temperature sensing devices. The temperature sensors 88 are connected by an electrical cable 92, while the humidity sensors 90 are connected by electrical cable 94 to different inputs of the control circuit 68 which may be a conventional control circuit used for controlling the atmosphere of lumber kilns in accordance with a predetermined program.

It should be noted that when it is desirable to remove the fan motors from the kiln because of higher heat, line shaft fans can be employed in place of cross flow fans 78 so that such fans are driven by a common drive shaft which extends parallel to the longitudinal axis of the kiln and is coupled to a fan motor mounted on the roof of the kiln. However, since such line shaft fans do not enable cross-flow of the heated air, they are not as efficient drying as the embodiment shown in FIGS. 1 and 2.

The two exhaust outlets 80 of the kiln 58 are connected through a common kiln exhaust conduit 96 and a fan 98 to the air inlets 100 of a pair of vertical wood chip silos 102 about 16 feet in diameter and 50 feet high which each contain a stack of wood chips 104 having a size range from about 0.3 microns to larger chips of about 2 inches long by 1/8 inch thick, serving as a filter media. The hot polluted exhaust air of the kiln is transmitted from air inlet 100 into the silo upward through the stack of wood chips 104 in the direction of arrows 106 and out through air outlet 108 at the top of each silo. The exhaust air is filtered by the wood chips which further removes solid particle pollutants including ash particles and fine wood particles. Also the hydrocarbon vapors and other gaseous pollutants condense out of the exhaust air stream onto the surface of the wood chips due to the temperature drop of the air within the silos. Thus, the temperature of the air passing through the outlet 108 is only approximately 90° to 100° F., while the hot exhaust air flowing through inlet 100 is approximately 140° F. so that there is a temperature drop of approximately 40° to 50° F. within each silo 102.

Alternatively, the hot dryer exhaust air in conduit 52 may be transmitted directly to the air inlet 100 of the chip silos 102 by means of an optional fan 110 when it is not desired to transmit such dryer exhaust air through a lumber kiln or any other secondary wood drying container. In this case, the exhaust air flowing through the air inlet 100 of the silo is approximately 175° F. so that there is even more condensation of pollution vapor on the wood chips because the temperature drop is on the order of 75° to 85° F. within the wood chip silo.

The contaminated wood chips within the silos 102 having hydrocarbon condensate deposited thereon are discharged from the bottom of the chip stacks 104 through a discharge opening 112 at the bottom of the silos. The chip discharge opening 112 may be provided at the bottom of a conical funnel portion 114 attached to the bottom end of the cylindrical sides of the silo and closed by a sliding gate 116 discharge unloader. The discharge gate 116 may be operated by a pressure sensing control circuit 118 in the manner shown in FIG. 3. The discharge gate 116 may be coupled to the piston rod 119 of a cylinder 120 which is moved by a solenoid actuated valve 122 in response to the output signal of the control circuit 118. The control circuit has its input connected to a pressure sensor 124 which is positioned within the kiln exhaust air conduit 96 adjacent the air inlet opening 100 of the wood chip silo 102. As a result, when the pressure, $P_1$, at the air inlet 100 of the first silo exceeds a predetermined maximum pressure, the control circuit actuates the valve 122 which causes the cylinder 120 to move the gate 116 from the closed position shown to an open position to discharge wood chips from the stack 104 through discharge opening 112 until the pressure at the inlet 100 reduces below such maximum pressure. The control circuit may be provided with an internal reference voltage corresponding to the predetermined maximum pressure which is compared with a voltage produced by the pressure sensor 124. Alternatively, the pressure sensor 124 may be of a switch type which only sends a signal to the control circuit 118 when the pressure within the conduit 96 exceeds a predetermined maximum pressure.

The above described pressure control operation of the discharge gate 116 assumes that wood chips are only intermittently discharged from the stack 104 after they have become sufficiently contaminated to cause a significant increase in pressure in the input line 96. However, in some instances it may be preferable to provide a continuous or regular intermittent flow of wood chips through the silo 102 thereby continuously replenishing the filter media before any significant contamination of the wood chips takes place. In this case, the pressure sensor and control circuit 118 can be eliminated and the gate 116 can be actuated by a timer or eliminated entirely. In any event, an input feeder conveyor 126 is provided adjacent the top of both of the silos 102 for feeding wood chips through chip input funnels 128 provided in the top of the silos which may be provided with one-way check valves 130 for preventing wood chips from being blown out of the silo through such input funnels. Also the air exhaust outlets 108 of the silos may be screened to prevent wood chips from being blown out through such outlets by fan 98. Level controls (not shown) may be used to control the level of the stack of wood chips in each silo, including a light source and photocell detector positioned within the silo on opposite sides of the top of the stack.

The contaminated wood chips discharged from each silo are fed through a sealed output conveyor 132 of the screw or auger type from the discharge opening 112 to an air lock 134 where they are deposited onto an out feed conveyor 136 of a conventional type which transports such wood chips to the chip storage bin 36. The contaminated wood chips are mixed with clean wood chips which are also supplied to the chip storage bin 36 and the mixture of chips is transmitted through the metering bin 38 to the rotary dryer 10 for further drying. After drying in the rotary dryer, the contaminated wood chips and the clean wood chips are emitted from the bottom of the cyclone separators 48 and deposited onto an out feed conveyor 138 which transmits the dried wood chips to a chip board manufacturing machine or other apparatus for the production of commercial wood products. This use of the contaminated wood chips in commercial wood products disposes of the pollutants filtered by the wood chips.

The lumber unloaded from the kiln 58 has pollutants deposited on the rough surfaces of such lumber and the contaminated surface layer is removed by a lumber planar 140 which produces smooth finished lumber or boards. If the lumber planer 140 is of the type which produces wood chips when planing the contaminated surface layer off the lumber, such contaminated wood chips may also be transmitted to the wood storage bin 36 for further drying in the rotary dryer 10 and subsequent use of the contaminated chips in the production of chip board or other wood products. However, if the lumber planer is of the type which produces fine wood shavings or other non-chip waste then such wood waste can be transmitted through a hammer mill or any suitable pulverizer to convert such waste into fine wood particles which are burned in the wood burner 12.

As shown in FIG. 3, the discharge cone 114 at the bottom of each wood chip silo 102 is provided with a stirring rake member 142 which pivots in a conical path about a pivot 144 at the bottom thereof which may be attached to a rotating vertical drive shaft (not shown) to provide such pivoting movement. The stirring member 142 loosens the wood chips in the discharge cone 114 which are packed together by the weight of the chip stack, and acts like an auger to cause such chips to flow downward through the discharge opening 112. The air inlet 100 of the chip silo 102 is provided by an annular manifold 146 surrounding top of the conical funnel portion 114 at the bottom of the silo. A plurality of air inlet openings 148 are provided through the wall of the funnel portion 114 in a perforated band area at the top thereof which is enclosed by the manifold 146. As a result, the kiln exhaust air flows into each chip silo 102 through the air inlet openings 148 surrounding the bottom end of the silo for more uniform distribution of the exhaust air throughout the stack of wood chips 104 functioning as the filter media within such silo. This annular manifold 146 and air inlet openings 148 also enables the wood chips to be discharged through the discharge funnel 114 at the bottom of the silo. Thus, the most contaminated chips are discharged from the silo first so that the chips flow through the silo on a first-in, first-out basis.

It should be noted that the kiln exhaust air flows through conduit 96 at a rate of approximately 55,000 cubic feet per minute (CFM), while the dryer exhaust air flowing through conduit 56 into such kiln is about 50,000 CFM. The additional 5000 CFM flow of kiln exhaust air as well as the added air necessary to maintain the total circulation flow of 224,000 CFM within the kiln are provided by the hot burner air flowing through conduit 60. It is estimated that the dryer exhaust air flowing through conduits 52 and 56 will have an amount of solid particle pollutants on the order of approximately 26 pounds per hour, while the output air of the kiln transmitted through exhaust conduit 96 will have a solid particle pollutant content of about 13 pounds per hour so that approximately one-half of the solid pollutants are settled in the lumber kiln acting as a filteration chamber. In addition, the wood chips in the silos 102 will provide further filtering to produce an exhaust air at outlets 108 having a solid pollutant content of only about 6.5 pounds per hour. Such wood chip filter also removes most of the hydrocarboon vapor pollutants by condensation on the wood chips as described above. Thus, the wood chip filter and the wood drying system of the present invention provide an extremely efficient pollution control apparatus and method and also enables good heat energy conservation by utilizing the hot exhaust gas of the dryer 10 for further drying of lumber in kiln 58 and wood chips in silos 102. Furthermore, by utilizing the contaminated wood chips in the production of chip board or other commercial wood products, the pollution waste disposal problem is solved.

It will be obvious to those having ordinary skill in the art that many changes may be made in the details of the above described preferred embodiment of the present invention without departing from the spirit of the invention. For example, the container 102 for the filter of wood chips can be a horizontal pipe and the contaminated chips discharged from the hot air inlet end of the pipe by a mechanical conveyor such as a screw conveyor. Therefore, the scope of the present invention should only be determined by the following claims.

I claim:

1. Method of treating polluted air to remove pollution, comprising the steps of:
   supplying a stream of polluted air containing hydrocarbon pollutants;
   transmitting said polluted air through a container containing a plurality of wood members;
   filtering said hydrocarbon pollutants from said polluted air by contact with said wood members to produce contaminated wood members;
   moving said wood members through said container to cause said wood members to act as filter elements in different positions within said container; and
   removing said contaminated wood members from said container.

2. A method in accordance with claim 1 in which the wood members are wood chips.

3. A method in accordance with claim 2 in which the polluted air is supplied from the output of a wood dryer and the wood chips filter pollutants including solid particles and hydrocarbons from the polluted air and coondense hydrocarboon vapors on said chips.

4. A method in accordance with claim 3 in which the wood chips are supported in a stack of chips within said container and the polluted air is transmitted through the stack from one end to the other end of said stack thereby producing contaminated wood chips coated with pollutants, said coated wood chips being moved through said stack and discharged therefrom.

5. A method in accordance with claim 4 in which the stack is supported as a vertical stack and the polluted air enters adjacent the bottom end and exits adjacent the top end of the stack, and in which the wood chips are supplied into the top end and the contaminated wood chips are removed from the bottom end of the stack.

6. A method in accordance with claim 5 in which the wood chips are stirred in the bottom of the stack to loosen them for removal.

7. A method in accordance with claiim 2 in which the contaminated wood chips having hydrocarbon pollutants condensed thereon are processed into chip board wood products.

8. A method of treating polluted air to remove pollution, comprising the steps of:
   supplying a stream of polluted air containing hydrocarbon pollutants;
   transmitting said polluted air through a container containing a plurality of wood members which are lumber with rough sawn surfaces on which the hydrocarbon pollutants and solid particle pollutants are deposited;
   filtering said hydrocarbon pollutants from said polluted air by contact with said wood members to produce contaminated wood members; and
   removing said contaminated wood members from said container.

9. A method in accordance with claim 8 in which the lumber is supported in a kiln serving as said container and the contaminated rough surface of the lumber with the pollutant deposit is removed after the lumber is discharged from the kiln.

10. Method of treating hot exhaust gas to conserve heat energy, remove pollution and dispose of pollutants, comprising the steps of:
    supplying a stream of hot exhaust gas containing pollution material including solid particles and hydrocarbon vapor from the output of a wood dryer;
    transmitting said exhaust gas through a container containing wood members to dry said wood members;
    condensing said hydrocarbon vapor from said exhaust gas onto said wood members to provide contaminated wood members;
    removing said contaminated wood members from said container; and
    processing said contaminated wood members to produce commercial wood products containing said pollution material and thereby dispose of the pollutants.

11. A method in accordance with claim 10 in which the exhaust gas is filtered through a filter container of wood chips to remove the pollution particles and condense the hydrocarbon vapor.

12. A method in accordance with claim 11 in which the contaminated wood chips are removed from the filter container and processed into chip board wood products.

13. A method in accordance with claim 11 in which the stream of hot exhaust gas is supplied by a wood chip dryer which is fed with wood chips including contaminated wood chips taken from the filter container.

14. A method in accordance with claim 13 in which the exhaust gas is transmitted from the wood chip dryer to a lumber kiln for drying lumber therein and is transmitted from said kiln to said filter container.

15. A method in accordance with claim 13 in which the wood chip dryer is a rotary dryer which is supplied with hot air from a wood dust burner for drying the wood chips and producing said stream of exhaust gas.

16. A method in accordance with claim 14 in which the kiln is supplied with hot air from a wood dust burner which also supplies hot air to the wood chip dryer, said hot burner air being mixed with the exhaust gas of said dryer to heat said kiln and the mixture of hot burner air and dryer exhaust gas being adjusted in accordance with the temperature and moisture content of the atmosphere within the kiln.

17. A method in accordance with claim 16 in which recirculating air drom the kiln is premixed with the hot burner air to lower its temperature before it is mixed with the dryer exhaust air and supplied to the kiln.

18. Dryer apparatus with pollution control for removing pollutants from the exhaust gas emitted therefrom and for conservation of heat energy, comprising:
   dryer means for drying organic material with hot air and causing said organic material to emit hydrocarbon pollutants into said air and thereby produce a stream of hot humid exhaust air containing pollutants including solid particles and hydrocarbon vapor at the exhaust outlet of said dryer means;
   lumber kiln means for drying lumber with hot air transmitted from an air inlet to an air outlet of said kiln means; and
   first conduit means for conveying said polluted hot exhaust air from the exhaust outlet of said dryer means to the air inlet of said kiln means so that said exhaust air is circulated through said kiln means and contacts said lumber to dry said lumber and to deposit a portion of said pollutants from said exhaust air onto said lumber.

19. Apparatus in accordance with claim 18 which also includes wood chip container means containing a stack of wood chips and having an air input adjacent the bottom thereof and an air output adjacent the top thereof; and
   second conduit meeans for conveying said hot exhaust air from the air outlet of said kiln means to the air input of said container means so that said exhaust air is transmitted upward through said stack of wood chips to the air output of said container means and said wood chips filter said exhaust air to remove said hydrocarbon pollutants.

20. Apparatus in accordance with claim 19 in which the dryer means is supplied with hot air from a wood particle burner means having a burned ash separator means for removing ash particles from the hot air supplied by said burner.

21. Apparatus in accordance with claim 19 in which the dryer means is a wood chip dryer and which includes feeder means for feeding wood chips into the top of said container means, and discharge means for discharging contaminated wood chips from the bottom of said container means, said contaminated wood chips having hydrocarbon pollutants deposited thereon and means for feeding said contaminated wood chips into said wood chip dryer.

22. Apparatus in accordance with claim 21 in which the wood chip dryer is a rotary dryer and the dried wood chips are conveyed out of said dryer in the exhaust air, said exhaust air being transmitted through cyclone separator means for separating the dried wood chips from the exhaust air before said exhaust air is transmitted to the kiln.

23. Apparatus in accordance with claiim 18 in which the kiln means contains circulation means for circulating the air within said kiln means through and between stacks of lumber, including circulation fans for circulating said kiln air.

24. Apparatus in accordance with claim 23 in which the circulation means includes an air input distribution conduit extending longitudinally of the kiln above said stacks of lumber and a plurality of branch conduits extending down from said distribution conduit between stacks of lumber, said branch conduits each being provided with a pluralityy of outlet openings to direct the air between different levels of lumber in each stack.

25. Apparatus in accordance with claim 19 in which a portion of the hot air from the burner is mixed with the exhaust air from the dryer and supplied to said kiln, said mixture being adjusted by a control means in response to control signals from temperature and moisture sensors within the kiln.

26. Filter apparatus, comprising:
   a stack of wood particles;
   a container means for containing said stack of wood particles while allowing said wood particles to move through said container means to provide a moving filter media, said container means having a gas inlet adjacent one end of said container and a gas outlet adjacent the other end of said container means;
   gas supplying means for transmitting a gas stream from a gas inlet conduit connected to the gas inlet through said stack of wood particles forming said moving filter media to the said gas outlet in order to filter the gas stream and remove pollutants from said gas stream;
   discharge means for discharging wood particles from a discharge opening at the gas inlet end of said container means;
   and
   feed means for feeding wood particles into a supply opening at the gas outlet end of said container means to replace the discharge wood particles.

27. Filter apparatus in accordance with claim 26 in which the wood particles are wood chips.

28. Filter apparatus in accordance with claim 27 in which the wood chips are packed in a substantially vertical container means to provide said stack.

29. Filter apparatus in accordance with claim 26 in which the gas supply means is a wood dryer means which supplies hot exhaust air containing hydrocarbon pollutants.

30. Filter apparatus in accordance with claim 28 in which the vertical container means contains a stirring means at the bottom end thereof to loosen the wood particles so that they can be discharged from said discharge opening located at the bottom of said container means.

31. Filter apparatus in accordance with claim 30 in which the discharge opening is covered by a gate means which is pened and closed by a control means in response to the pressure in the gas inlet conduit to discharge wood chips when the pressure exceeds a predetermined limit.

32. Filter apparatus in accordance with claim 31 in which a sealed outfeed conveyor is connected between said discharge opening and an air lock means for conveying the wood chips from said discharge opening through said air lock means.

33. Filter apparatus in accordance with claim 29 in which the wood dryer is a wood chip dryer and the wood particles in the container means of the filter are wood chips, said wood chips being discharged by said discharge means from said container means onto a conveyor means and conveyed to said dryer by said conveyor means.

34. Filter apparatus in accordance with claim 26 in which the gas inlet conduit is connected to a manifold means on the container for supplying said gas into the gas inlet of the container through a plurality of inlet openings surrounding the wood particle discharge means.

* * * * *

UNITED STATES PATENT AND TRADEMARK OFFICE
CERTIFICATE OF CORRECTION

PATENT NO. : 4,431,405
DATED : February 14, 1984
INVENTOR(S) : J. ROGER EATHERTON It is certified that error appears in the above-identified patent and that said Letters Patent is hereby corrected as shown below:

```
In the Abstract, line 16 "a" should be deleted.
Column 1, line 17 "supposed" should be --supported--.
Column 1, line 66 "but" should be --by--.
Column 2, line 4 "ignition" should be --ignitor--.
Column 2, line 18 "actually" should be --usually--.
Column 6, line 40 "178" should be --1/2 inch--.
Column 8, line 9 "planar" should be --planer--.
Column 9, line 45 "coondense" should be --condense--.
Column 9, line 62 "claiim" should be --claim--.
Column 11, line 25 "meeans" should be --means--.
Column 11, line 53 "claiim" should be --claim--.
Column 11, line 64 "pluralityy" should be --plurality--.
```

Signed and Sealed this

Seventh Day of August 1984

[SEAL]

Attest:

*Attesting Officer*

GERALD J. MOSSINGHOFF

*Commissioner of Patents and Trademarks*